Patented Mar. 1, 1938

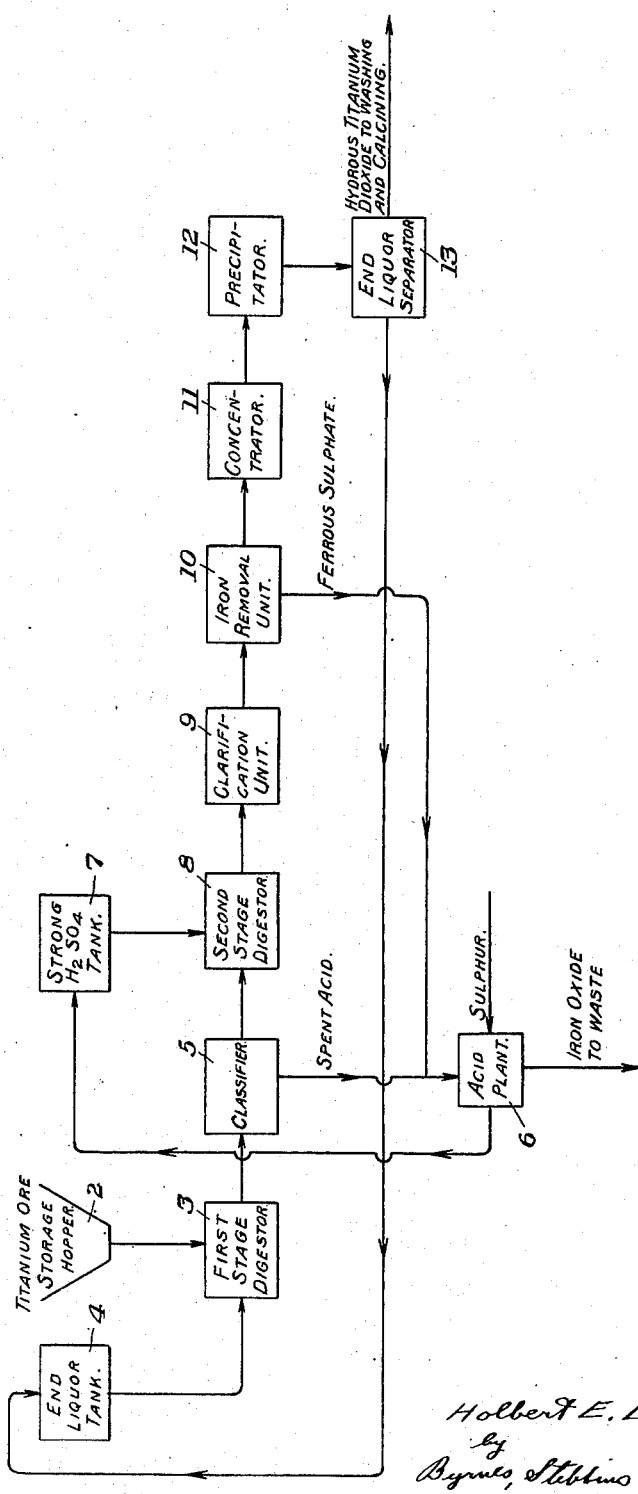

2,109,917

UNITED STATES PATENT OFFICE 2,109,917

PROCESS OF TREATING TITANIFEROUS ORES

Holbert E. Dunn, Crafton, Pa., assignor to Southern Mineral Products Corporation, Bridgeville, Pa., a corporation of Delaware Application June 4, 1935, Serial No. 24,857

8 Claims. (Cl. 75—6)

This invention relates to the treatment of titaniferous ores in the preparation of titanium dioxide pigment, and more particularly to a process of leaching such ores to reduce the content of phosphorus and other impurities in the pigment.

The accompanying drawing is a flow sheet illustrating one manner of carrying out the process.

In treating titaniferous ores, most generally ilmenites, by the usual sulphuric acid digestion in which their titanium content is converted into water soluble salts for the preparation of solutions suitable for precipitation of titanium dioxide pigments, it has been found that most of the phosphorus content of the ore is carried through to the final precipitate. This being the case, it is evident that the amount of phosphorus in the finished pigment will be proportionately greater as the titanium dioxide content in the pigment is increased over that in the ore. As much as 0.5% phosphorus pentoxide is not uncommon in the ores and even in the finished pigments hitherto commercially prepared this impurity runs 0.5 to 1%. Characteristic analyses of the ilmenites of commerce are as follows:

|  | Virginia | Travancore | Norway | Senegal |
|---|---|---|---|---|
|  | Percent | Percent | Percent | Percent |
| $TiO_2$ | 43.7 | 53.6 | 37.0 | 54.7 |
| $FeO$ | 37.6 | 26.7 | 32.6 | 7.3 |
| $Fe_2O_3$ | 13.2 | 14.2 | 23.0 | 30.3 |
| $SiO_2$ | 1.7 | 1.5 | 0.6 | 1.3 |
| $Al_2O_3$ | 0.8 | 1.1 | 0.6 | 0.5 |
| $MgO$ | 1.0 | 1.0 | 3.0 | 1.9 |
| $P_2O_5$ | 0.8 | 0.2 | 0.1 | 0.1 |

These analyses are representative of ilmenites which have been mechanically and magnetically concentrated to the greatest extent economically feasible.

In some cases the phosphorus content of the ilmenite may be ascribed to surface accretions or incrustations of phosphorus bearing minerals such as apatite or even to actual incrustations in the grains of the ilmenite itself, of such a nature that ordinary mechanical methods of concentration cannot remove it without involving excessive losses, entailed by excessive grinding. Furthermore, if fine grinding is resorted to in order to free the phosphorus containing materials from the ilmenite, magnetic separation which is the most satisfactory means of separation available becomes grossly inefficient if not impossible. For example, in a copending application, Ser. No. 644,833, B. D. Saklatwalla and H. E. Dunn have described a process for the concentration of ilmenite from nelsonite ore, thereby opening up to commerce deposits which have hitherto been unworkable. This process comprises grinding the ore to a limited extent sufficient to reduce the gangue, which consists principally of clay and biotite alteration products, to a finely divided condition, but not to pulverize the ilmenite and apatite crystals, desliming and wet classifying to separate the finely ground gangue from the ilmenite and apatite, and thereafter magnetically selectively separating the ilmenite, apatite and biotite. By this means ilmenite concentrates, and which have the analysis given for the Virginia ore above, are made available. Further reduction of the phosphorus content by attempting to get more complete separation of the apatite from the ilmenite by means of finer grinding has not been successful due to the impossibility of making a magnetic separation of ilmenite, apatite, biotite mixtures of very much finer than about 65 mesh.

For many purposes, titanium dioxide is required to be of the highest possible purity, preferably 99% titanium dioxide or better. This is impossible if any appreciable amount of phosphorus, say of the order of 0.5% phosphoric anhydride be allowed to contaminate the product inasmuch as certain other small amounts of impurities such as silica, alkali, and sulphuric anhydride are always present to a greater or less extent sufficient to prevent a titanium dioxide above 99% unless the phosphorus is kept well below the amount noted above.

I have found that the phosphorus content of the impure ore can be effectively reduced to the permissible limits, other impurities may also be removed, and I gain further advantages hereinafter pointed out by carrying out the sulphuric acid digestion in two stages by the use of relatively weak acid in the first stage and the use of relatively strong acid in the second stage. The strength of the acid in the first stage and the temperature and time at which the ore is subjected to the acid must be closely controlled in order to obtain the desired results. In the first stage of the digestion process, the phosphorus, lime, magnesia and alumina are markedly lowered by the treatment with weak sulphuric acid of about 5 to 20% strength which dissolves the phosphorus content and either dissolves or deflocculates the lime, magnesia and alumina so that they can be satisfactorily removed by decantation. The strength of the acid and the temperatures employed are such, however, as not to materially convert the titanium and iron contents into the corresponding sulphates. In the second stage, the residual ore is sulphated with stronger sulphuric acid to form the water-soluble titanium and iron sulphates, from which a solution of titanium and iron sulphates may be formed and subjected to hydrolysis in accordance with well known methods to precipitate titanium dioxide therefrom.

The removal of these phosphatic and gangue materials in the first stage of my process greatly facilitates the clarification of the relatively viscous liquors obtained in the subsequent dissolution of the ilmenite itself in concentrated sulphuric acid in the second stage and also decreases the consumption of concentrated acid necessary for solution of the ilmenite. This is particularly important since I have found that the waste, end or mother liquors obtained in the hydrolytic precipitation of titanium dioxide, which liquors have been made available by means disclosed in a copending application by A. B. Hettrick, Ser. No. 22,183 filed May 28, 1935, can be used effectively as a source of weak acid for the first step of my process, and which would otherwise present a problem of disposal or recovery. The process described in the said Hettrick application consists briefly in removing mother liquor from titaniferous hydrolysis precipitates by subjecting a slurry of mother liquor and precipitate to centrifugal action in an imperforate container. The precipitate is collected in a cake on the wall of the container and the mother liquor is caused to flow along the inner periphery of the cake and over the top of the container. After the mother liquor has been removed, the cake of precipitate is discharged. The mother liquor or end-liquor so obtained is of a strength suitable for leaching the impure ore in accordance with the first step of my process for the removal of phosphorus. In the Hettrick invention it is not necessary to dilute the slurry of precipitate and mother liquor before subjecting it to centrifugal action, and for this reason the mother liquor obtained from that process is of a relatively high strength, for example 20%, as compared with the end-liquor which results from the usual processes of separating the precipitate from the mother liquor. In the usual processes in which the precipitate is separated from the mother liquor by filtering, it is necessary to materially dilute the slurry before filtering.

My invention comprises first treating the ilmenite ore with relatively dilute sulphuric acid, thereby removing impurities by both dissolution and sliming, but without materially converting the titanium and iron contents into the corresponding sulphates, and then in the second stage treating the purified ore with concentrated sulphuric acid to convert it to the corresponding iron and titanium sulphates.

In the application of the first stage of the process, I prefer to use a rotating drum or cylinder lined with acid-proof brick so arranged as to provide lifting flights which insure constant agitation of the ilmenite to be treated. A drum, four foot inside diameter by twelve feet long, is rotated at a speed of 6 to 24 revolutions per minute as required. The interior of the machine is maintained at a temperature of 180°–200° F. by means of an oil burner inserted at the feed end of the rotating drum.

A continuous feed of ilmenite, insured by an automatic feeding device, and 20% sulphuric acid, in the form of fresh acid or preferably obtained from the titanium dioxide precipitating unit, as, for example, by the centrifugal separation described in the beforementioned copending application Ser. No. 22,183, are fed simultaneously at a rate of one pound of 20% acid to one pound of ilmenite, the ilmenite being fed to a unit of this size at rates up to 2000 pounds per hour. Passage through the rotating drum provides exposure of about one-half to three quarters of an hour to the hot 20% acid. The slurry is discharged into the bowl of a classifier of acid-proof construction to remove siliceous and insoluble sulphate slimes as well as impurities which have gone into solution. I prefer to use a classifier rather than a filter, since I have found that calcium sulphate, alumina and other gangue rock residuals tend to become sufficiently deflocculated even though not taken into solution that they may be decanted easily from the bowl of the classifier while the heavy ilmenite settles to the bottom and is dragged off by the classifier mechanism. Any decanting device, such as a hydroseparator or Allen cone might be substituted for the classifier. As much as 2% increase in the titanium dioxide content of the so-treated ilmenite may be ascribed to this classification procedure.

Characteristic analyses of nelsonite ilmenite before and after this treatment are as follows:

|  | Before leaching | After leaching |
|---|---|---|
|  | Percent | Percent |
| $TiO_2$ | 42 –43 | 48 –49 |
| $FeO$ | 34 –36 | 38 –39 |
| $Fe_2O_3$ | 13 –15 | 13 –14 |
| $P_2O_5$ | 0.5– 0.8 | 0.01–0.1 |

The calcined titanium dioxide pigment prepared from such an ilmenite will contain from 1.3 to 2% phosphoric anhydride if made directly from the ore, but only 0.08 to 0.3% when prepared from ore treated as described.

The purified ilmenite sands discharged from the classifier are then sulphated with strong sulphuric acid by well known means, as, for example, the process described by Washburn in Patent No. 1,889,027. I have found the process described by W. C. Hoocy in the copending application Ser. No. 671,693 to be well adapted to this purpose, wherein the ilmenite sands are heated and mixed with hot 80% sulphuric acid sufficient in amount to keep the mixture liquid at all times in a continuous process. The titanium sulphate solution so obtained is clarified and may be precipitated by the continuous process described by Saklatwalla and Dunn in Patent No. 1,959,765. The end-liquor may be continuously removed from the precipitation slurry by means of a centrifuge, as disclosed in the Hettrick application above referred to. There is thus obtained a continuous cyclic process for the manufacture of titanium dioxide. The liquor separated by the classifier may be economically converted to strong sulphuric acid by well known means and used for dissolving the leached ore resulting from the treatment with weak acid in order to produce the strong liquor containing titanium and iron sulphates which is thereafter hydrolyzed to precipitate the titanium dioxide.

In treating in the first stage of my process, an ilmenite concentrate such as ilmenite from Virginia nelsonite, I find that not only the phosphorus content is removed, but such other acid soluble gangue constituents as magnesia, alumina and lime also are removed, resulting in the following economy of strong acid which must be applied in the subsequent sulphating operation. For example, 100 pounds of untreated ilmenite compares to treated ilmenite as follows:

|  | Untreated | Treated |
|---|---|---|
| $TiO_2$ | 43.0×2.45=107.6 | 49.3×2.45=120.8 |
| FeO | 34.9×1.36= 47.5 | 37.3×1.36= 50.7 |
| $Fe_2O_3$ | 15.2×1.84= 27.9 | 12.2×1.84= 22.4 |
| $Al_2O_3$ | 1.17×2.88=  3.4 | 0.12×2.88=   .3 |
| CaO | .70×2.07=  1.4 | 0.13×2.07=   .3 |
| MgO | 1.13×2.43=  2.7 | 0.09×2.43=   .2 |
|  | 190.5 | 194.7 |

Acid required:

$$\frac{190.5}{43.9} = 4.34 \text{ lbs. } H_2SO_4/\text{lb. } TiO_2$$

for untreated ilmenite;

$$\frac{194.7}{49.3} = 3.94 \text{ lbs. } H_2SO_4/\text{lb. } TiO_2$$

for treated ilmenite; which amounts to a saving of 4.34−3.94=0.4 pound sulphuric acid per pound of titanium dioxide. Since one ton of ilmenite at 43.9% titanium dioxide contains 878 pounds of titanium dioxide, the saving per ton of ilmenite amounts to 351 pounds of sulphuric acid which at $15.00 per ton (100%) would amount to $2.63 per ton of ilmenite treated.

The loss in weight involved in extracting the dilute acid soluble constituents of the ilmenite amounts to about 10%, or that much less weight to be handled in the next stage or in shipment if the sulphating is to be done elsewhere.

My process is particularly well adapted to nelsonite ilmenite, as shown above, but other ores may have their phosphorus contents which already are relatively low, slightly reduced. For example, I have obtained the following results on various ilmenites:

| Ilmenite | Untreated | | Treated | |
|---|---|---|---|---|
|  | Percent $TiO_2$ | Percent $P_2O_5$ | Percent $TiO_2$ | Percent $P_2O_5$ |
| Travancore | 53.5 | 0.30 | 53.7 | 0.28 |
| Senegal | 55.0 | 0.09 | 56.2 | 0.05 |
| Norway | 40.2 | 0.06 | 41.6 | 0.01 |
| Virginia | 42.6 | 0.75 | 49.1 | 0.06 |

In carrying out the first stage of my process, the direct fired rotary drum is the preferred type of apparatus, having proven to be sufficiently efficient as an agitator and continuous and economical in operation. However, simply a tank provided with an agitator, steam heating coils or other means of heating may be used.

Acid as dilute as 5% sulphuric acid has been found to remove phosphate to an extent such that only 0.05% phosphoric anhydride remains in the leached product, although I prefer to operate at an acid strength of approximately 20% to insure uniformity of product.

In carrying out the leaching of the ore with weak acid, I employ a temperature of 180 to 200° F. If lower temperatures are used, the desired removal of phosphorus is not accomplished. Where the reaction is carried out at room temperature a product averaging between 0.2 and 0.3% phosphoric anhydride is produced. This is ascribed to insufficient penetration into the ilmenite grain. Carefully prepared and microscopically clean grains of nelsonite ilmenite show a phosphoric anhydride content of 0.5% which when treated in accordance with my invention becomes 0.05–0.1% and shows quite deep penetration of the acid into the grain. If temperatures above about 200° F. are used, the ore will cake on the rotary drum, building up to such an extent as to clog the drum openings and necessitate stopping the operation from time to time to remove the cake. Experience has shown that the temperature and acid concentration ranges are essential if a uniform product running 0.05 to 0.10% phosphoric anhydride is desired. The use of such a grade of low-phosphorus ilmenite makes possible the production of titanium dioxide containing 0.10 to 0.20% phosphoric anhydride.

Referring now to the flow sheet which illustrates one manner in which the process may be carried out, the titanium ore is fed from a storage hopper 2 to a digester 3 used in the first stage of the digestion process. This digester is preferably a rotating drum or cylinder, as previously described, and is heated by an oil or other burner so as to maintain the ore at a temperature of 180 to 200° F. Weak sulphuric acid of 5 to 20% strength is also fed to the digester 3 from a tank 4.

The slurry from the digester 3 is discharged into a classifier 5 in which the purified ore settles to the bottom. The calcium sulphate, alumina and other gangue rock residuals are sufficiently deflocculated by the treatment in the digester 3 so that they may be decanted along with the solution containing the phosphorus. The spent acid from the classifier 5, after removal of gangue material therefrom, is treated in the usual manner in an acid plant 6 to convert it into strong acid which is delivered to a tank 7 from which it is fed to a second-stage digester 8. In the digester 8 the titanium and iron contents of the purified ore are converted into the corresponding sulphates in accordance with any known method. The titanium and iron sulphates are brought into solution and the solution is clarified by passing it through settling tanks or sand filters 9 to separate any gangue material which may be present. The clarified solution is then treated with metallic iron to convert ferric sulphate into ferrous sulphate, and the solution is cooled in a crystallization unit 10 and the ferrous sulphate removed and returned to the acid plant 6. The solution is concentrated in a unit 11 and then fed to a precipitator 12 which may be advantageously of the type disclosed in Saklatwalla and Dunn Patent No. 1,959,765. After precipitation, the precipitate is separated from the end-liquor in a separator 13, as, for example, by the process described in the aforementioned Hettrick application, and the end-liquor is returned to the tank 4 for the treatment of further quantities of impure ore for the removal of phosphorus and other impurities therefrom.

I have described in detail the present preferred manner of carrying out my process. It is to be understood, however, that the process is not limited to the steps described, but may be otherwise practiced within the scope of the following claims.

I claim:

1. In the treatment of ilmenite ores of the type of Virginia nelsonite ilmenite and Norwegian ilmenite for the preparation of titanium dioxide pigments by hydrolysis of a solution containing titanium sulphate, the process of removing phosphorus and other impurities comprising treating the unreduced ilmenite ore with sulphuric acid of 5% to 20% strength while maintaining the ore at a temperature of about 180 to 200° F. to dissolve the phosphorus, and separating the solution containing the phosphorus from the purified ore.

2. The process of treating ilmenite ores of the type of Virginia nelsonite ilmenite and Norwegian ilmenite whereby their ilmenite content is preserved substantially intact but the phosphorus and other impurities objectionable in the preparation of titanium alloys and titanium dioxide pigments are removed, comprising treating the unreduced ore with sulphuric acid of 5 to 20% strength while maintaining the ore at a temperature of about 180 to 200° F., the concentration of the acid and the temperature being so regulated as not to decompose or alter the essential iron titanate composition of the ilmenite but to dissolve the phorphorus, and separating the solution containing the phosphorus from the purified ore.

3. The process of treating ilmenite ores of the type of Virginia nelsonite ilmenite and Norwegian ilmenite whereby their ilmenite content is preserved substantially intact but the phosphorus and other impurities objectionable in the preparation of titanium alloys and titanium dioxide pigments are removed, comprising treating the unreduced ore with sulphuric acid of 5 to 20% strength and in proportion equivalent to about one pound of 20% acid to one pound of ore while maintaining the ore at a temperature of about 180 to 200° F., the concentration of the acid and the temperature being so regulated as not to decompose or alter the essential iron titanate composition of the ilmenite but to dissolve the phosphorus, and separating the solution containing the phosphorus from the purified ore.

4. The process of treating ilmenite ores of the type of Virginia nelsonite ilmenite and Norwegian ilmenite whereby their ilmenite content is preserved substantially intact but the phosphorus and other impurities objectionable in the preparation of titanium alloys and titanium dioxide pigments are removed, comprising treating the unreduced ore for a period of about 30 to 45 minutes with sulphuric acid of 5 to 20% strength while maintaining the ore at a temperature of about 180 to 200° F., the concentration of the acid and the temperature being so regulated as not to decompose or alter the essential iron titanate composition of the ilmenite but to dissolve the phosphorus, and separating the solution containing the phosphorus from the purified ore.

5. The process of treating ilmenite ores of the type of Virginia nelsonite ilmenite and Norwegian ilmenite whereby their ilmenite content is preserved substantially intact but the phosphorus and other impurities objectionable in the preparation of titanium alloys and titanium dioxide pigments are removed, comprising treating the unreduced ore for a period of about 30 to 45 minutes with sulphuric acid of 5 to 20% strength and in proportion equivalent to about one pound of 20% acid to one pound of ore while maintaining the ore at a temperature of about 180 to 200° F., the concentration of the acid and the temperature being so regulated as not to decompose or alter the essential iron titanate composition of the ilmenite but to dissolve the phosphorus, and separating the solution containing the phosphorus from the purified ore.

6. The process of treating ilmenite ores of the type of Virginia nelsonite ilmenite and Norwegian ilmenite whereby their ilmenite content is preserved substantially intact but the phosphorus and other impurities objectionable in the preparation of titanium alloys and titanium dioxide pigments are removed, comprising continuously feeding the unreduced ore and sulphuric acid of about 5 to 20% strength through a rotating drum while maintaining the ore in the drum at a temperature of about 180 to 200° F., the concentration of the acid and the temperature being so regulated as not to decompose or alter the essential iron titanate composition of the ilmenite but to dissolve the phosphorus, discharging the slurry and separating the solution containing the phosphorus from the purified ore.

7. The process of treating ilmenite ores of the type of Virginia nelsonite ilmenite and Norwegian ilmenite whereby their ilmenite content is preserved substantially intact but the phosphorus and other impurities objectionable in the preparation of titanium alloys and titanium dioxide pigments are removed, comprising treating the unreduced ore with sulphuric acid of 5 to 20% strength while maintaining the ore at a temperature of about 180 to 200° F., the concentration of the acid and the temperature being so regulated as not to decompose or alter the essential iron titanate composition of the ilmenite but to dissolve the phosphorus, and settling the purified ore and decanting the impurities.

8. The process of treating nelsonite ilmenite ores whereby their ilmenite content is preserved substantially intact but the phosphorus and other impurities objectionable in the preparation of titanium alloys and titanium dioxide pigments are removed, comprising treating the unreduced ore with sulphuric acid of 5 to 20% strength while maintaining the ore at a temperature of about 180 to 200° F., the concentration of the acid and the temperature being so regulated as not to decompose or alter the essential iron titanate composition of the ilmenite but to dissolve the phosphorus, and separating the solution containing the phosphorus from the purified ore.

HOLBERT E. DUNN.